Patented Oct. 5, 1926.

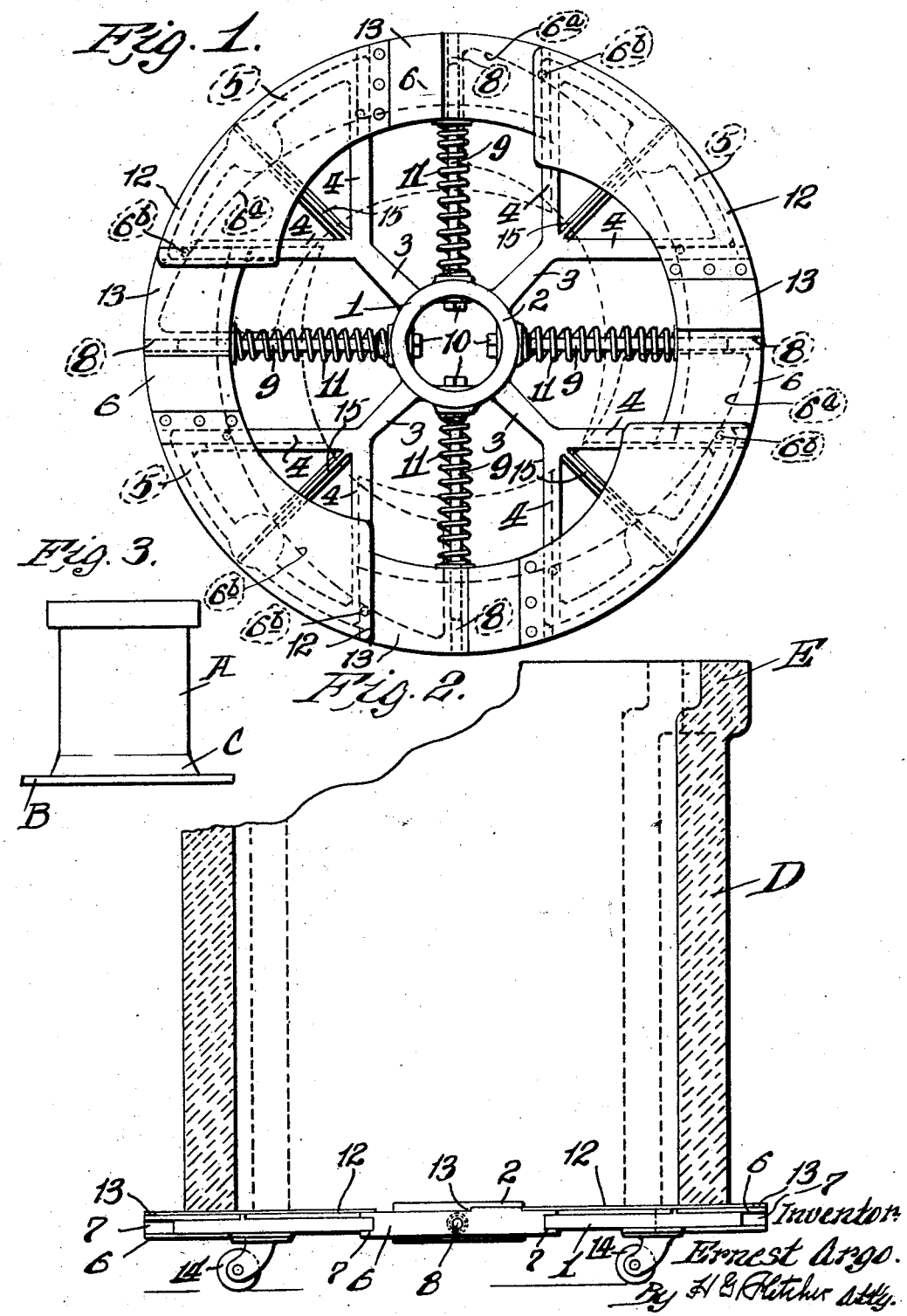

1,601,711

UNITED STATES PATENT OFFICE.

ERNEST ARGO, OF ST. LOUIS, MISSOURI, ASSIGNOR OF ONE-FOURTH TO LILLIAN M. JOHNSON, OF ST. LOUIS, MISSOURI, AND THREE-FOURTHS TO JOHN W. TIVIS, TRUSTEE, OF WEBSTER GROVES, MISSOURI.

APPARATUS FOR DRYING CLAY PRODUCTS.

Application filed February 10, 1923. Serial No. 618,212.

This invention relates to an improved apparatus for drying clay products and the like, such as sewer pipe, glass house pots, wall coping, tile, and etc., the primary intent being for the purpose of eliminating the heretofore breaking bond and consequent cracking attendant with the drying out of clay products during the contracting or shrinking stage.

Another object of the invention is in providing an apparatus in the form of a base or support for a relatively heavy clay product, said base being comprised of movable sections so that when the product is mounted on the base for the drying out of the product, the sections of the base will become fixed with the product mass or body and be moved therewith as a part thereof as the self hardening mass or product contracts during the drying out process of the product.

A further object of the invention is to provide a supporting base for molded or pressed clay products which is built up of sections that are movable towards each other.

Other and further objects will appear in the specification and be specifically pointed out in the appended claims, reference being had to the accompanying drawings, exemplifying the invention, and in which:—

Figure 1 is a plan view of this supporting base.

Figure 2 is a side elevation of Fig. 1 showing a sewer pipe mounted thereon during the drying out period.

Figure 3 is a view on a reduced scale of a sewer pipe length being dried out under the present day method.

The present method in which sewer pipe, glass house pots and the like, which are made of clay are permitted to dry out is by upending them upon a slab after they have been molded. In the instance of drying out sewer pipe after the molding thereof, assuming that the pipe is 42 inches in diameter after molding, after the pipe has been dried it will be found that the 42 inch molded pipe has shrunk to a diameter of 36 inches during the drying out process.

During the shrinking of the sewer pipe length, the lower portion of the pipe A, shown in Fig. 3 which is upended on a slab B, will drag on the slab during the shrinking of the pipe and form a flared end C. To rectify the flaring at the end of the pipe during the shrinking of the pipe, a clamp is placed around the flared portion C so that the flared portion will be squeezed circumferentially inwardly, and as it requires on or about two weeks for a large sewer pipe length to properly dry out before being placed in the kiln, the clamping operation of the flaring ends of the pipe will have to be carried on three or four times as the lower portion of the pipe which engages the slab will continually grip the slab as the remaining portion of the pipe is shrinking. This improved invention, therefore, eliminates the heretofore flaring of the slab engaging portion or lower end of the pipe.

This improved base is comprised of a spider 1 having a hub like center 2 and extending from said hub is a series or radially arranged arms 3, each of said arms having a pair of guiding portions 4 which are extended at right angles from one another and are joined together at their outer ends by an arcuate portion 5.

From the disclosure of Fig. 1, it is to be noted that each guiding portion 4 of each arm parallels a guiding portion 4 of an adjacent arm, each pair of adjacent guiding portions 4 of respective arms 3 serving as co-operable pairs of guiding portions for respective shoes 6, each shoe being provided on each side edge with a guide way 7, said guide-ways engaging over respective guiding portions 4.

An opening 8 is formed transversely through each shoe 6, each opening being for the sliding reception of one end of a rod 9, each rod of each shoe being horizontally disposed and secured at its opposite end by nuts such as 10 within the hub 2, and mounted over each rod is a coil spring 11, each spring bearing against a respective shoe 6 and hub 2.

Extended from one end of each shoe 6 is a plate 12, each plate having an overlapping relation with an adjacent shoe and for accommodating the overlapping extension of each plate a cut away portion 13 is provided on each shoe 6 in the upper surface thereof.

Casters or rollers such as 14 are secured to the under side of the spider 1 for movably supporting this improved base upon the floor.

In the operation of this improved device, when it is desired to dry out a sewer pipe length after the molding thereof, such as designated at D, the socket end E thereof is mounted upwardly in which the opposite end will be located upon the plurality of shoes 6 and their respective plates 12, as shown in Fig. 2. During the drying of the pipe length, after the mounting thereof on this improved base, as the material contracts or shrinks, the respective shoes 6 will be moved inwardly upon their respective guiding portions 4 simultaneously with the inwardly shrinking movement of the wall of the pipe in which the lower end thereof will move inwardly with the other portion of the pipe and consequently there will be no dragging or flaring of the lower end of the pipe as there now is by drying pipe under the present method.

Assuming that the pipe D in Fig. 2 is a 42 inch diameter pipe, the diameter thereof after shrinkage will be approximately 36 inches and consequently the travel of the shoes 6 inwardly will be approximately 3 inches.

The width of the shoes 6 which forms the supporting base for the sewer pipe may be made wide enough to accommodate articles or pipes or more than one size, the supposition being that the setting of the shoes shown in Figs. 1 and 2 will accommodate pipe lengths ranging from 42 to 39 inches diameter, whereas when it is desired to dry out pipe which range from 36 to 24 inches in diameter, the shoes 6 can be moved inwardly to the positions indicated at 6ª and held in such position by pins such as 6ᵇ, each pin being mounted in an opening provided in a respective guiding portion 4 as shown in Fig. 1. This moving of the sections 6 inwardly and holding them in the inwardly moved positions by the pins 6ᵇ provides a smaller diameter base.

The disclosure of the drawings pertains to a device for supporting sewer pipe or glass house pots and other cylindrical devices, but from the showing thereof, it is obvious that the theme of the invention can be carried further for supporting other self hardening plastic material products such as wall coping, tera cotta, fire brick, and so forth.

For assisting and supporting the overlapping plates 12, a ledge or track 15 is extended from each arm 3 by a respective arcuate portion 5.

After a sewer pipe length has been dried, upon the removal of the same from the support base, the springs 11 will force the shoes 6 and their respective plates 12 outwardly.

On account of the radial disposition of the shoes 6 being from a common center, during the drying out of a circular device such as a length of sewer pipe inasmuch as the shoes move inwardly towards the center by the contracting weight of the sewer pipe during the contracting thereof, the circular formation of the sewer pipe will therefore be permitted to simultaneously move or contract inwardly in a homogeneous body or mass and without restraint being applied to any portion thereof. There will therefore be no cracking or breaking of the binding bond of the clay mass during the contracting and drying out operation.

What I claim is:—

1. A supporting base for a molded body of plastic material comprising a series of radially disposed movable sections for the support of the molded body, said sections being free to travel with the molded body during the shrinking thereof.

2. A supporting base for a molded body of plastic material comprising a series of radially disposed sections upon which the molded body is mounted, said sections adapted to be moved towards each other, by the contracting weight of the molded body.

3. A base for supporting a mass of material which is subjected to shrinkage comprising a series of radially disposed slidable parts upon which the material mass is mounted, said parts being free to move with the material mass.

4. A supporting base for a product which is molded from a self hardening plastic material, comprises of a series of radially disposed members for the support of the product adapted to be moved inwardly by the contracting weight of the product when the product is supported thereby.

5. An apparatus for drying clay products comprising a series of horizontally disposed slidable members for the support of the product, a base for supporting said slidable members, and rolling means provided for the support of said base.

6. A supporting base for a molded body of plastic material comprising a series of sections upon which the molded body is mounted, said sections adapted to be moved towards each other by the contracting weight of the molded body, and resilient means related to each of said sections for moving them outwardly from each other after the molded body has been removed from said sections.

7. An apparatus for drying clay products comprising a series of circumferentially disposed arcuate sections, guiding means for slidably supporting said sections, said sections being for the support of a cylindrical shaped product adapted to travel with the shrinking weight of the product.

8. A supporting base for a product which is molded from a self-hardening plastic material comprising a pair of members for the support of the product which are adapted to be moved towards each other by the shrinking of the product during the drying thereof, and means co-operable with said members for moving them outwardly from each other after the product has been removed from said members.

ERNEST ARGO.